(12) United States Patent
Klick et al.

(10) Patent No.: US 7,942,565 B2
(45) Date of Patent: May 17, 2011

(54) ILLUMINATION DEVICE

(75) Inventors: Gunnar Klick, Regensburg (DE);
Hubert Ott, Bad Abbach (DE); Franz Schellhorn, Regensburg (DE); Mario Wanninger, Regensburg (DE); Georg Bogner, Lappersdorf (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 285 days.

(21) Appl. No.: 11/915,780

(22) PCT Filed: May 19, 2006

(86) PCT No.: PCT/DE2006/000868
§ 371 (c)(1),
(2), (4) Date: Aug. 14, 2008

(87) PCT Pub. No.: WO2006/128422
PCT Pub. Date: Dec. 7, 2006

(65) Prior Publication Data
US 2009/0201698 A1  Aug. 13, 2009

(30) Foreign Application Priority Data

May 31, 2005  (DE) .......................... 10 2005 024 964
Sep. 7, 2005  (DE) .......................... 10 2005 042 523

(51) Int. Cl.
*F21V 33/00* (2006.01)
(52) U.S. Cl. ......... 362/610; 362/555; 362/608; 362/613
(58) Field of Classification Search .................. 362/555, 362/560, 558, 608, 610, 611, 612, 613
See application file for complete search history.

(56) References Cited

U.S. PATENT DOCUMENTS

| 4,257,084 | A |  | 3/1981 | Reynolds |
| 6,347,882 | B1 |  | 2/2002 | Vrudny et al. |
| 6,655,809 | B2 | * | 12/2003 | Suzuki et al. .................. 362/610 |
| 6,877,873 | B2 |  | 4/2005 | Mai et al. |
| 6,959,995 | B2 | * | 11/2005 | Ikarashi et al. .................. 362/23 |
| 7,201,509 | B2 | * | 4/2007 | Erber ............................ 362/560 |
| 7,331,694 | B2 | * | 2/2008 | Lee et al. ...................... 362/335 |
| 7,333,249 | B2 | * | 2/2008 | Sawada ......................... 358/484 |

(Continued)

FOREIGN PATENT DOCUMENTS

DE  2 324 364  10/1998

(Continued)

OTHER PUBLICATIONS

I. Schnitzer et al., "30% external quantum efficiency from surface textured, thin-film light-emitting diodes", *Appl. Phs. Lett.*. vol. 63, No. 16, pp. 2174-2176 (Oct. 18, 1993).

(Continued)

*Primary Examiner* — Laura Tso
(74) *Attorney, Agent, or Firm* — Fish & Richardson P.C.

(57) ABSTRACT

An illumination device is specified which has a light source (1) suitable for coupling divergent electromagnetic radiation (6) into an optical waveguide (2), the electromagnetic radiation (6) being guided in the optical waveguide (2) on the basis of total reflection the optical waveguide (2) being suitable for changing a main radiating direction (17) of the electromagnetic radiation (6), and the optical waveguide (2) being formed in one piece. Light-emitting diodes are preferably used as the light source (1). The illumination device is particularly well suited to the backlighting of displays.

37 Claims, 6 Drawing Sheets

U.S. PATENT DOCUMENTS

| | | | |
|---|---|---|---|
| 7,338,193 B1 * | 3/2008 | Zeiger et al. | 362/551 |
| 7,419,287 B2 * | 9/2008 | Gasquet | 362/511 |
| 7,625,111 B2 * | 12/2009 | Lee et al. | 362/613 |
| 2002/0141174 A1 | 10/2002 | Parket et al. | |
| 2003/0147257 A1 | 8/2003 | Lee | |
| 2004/0208019 A1 * | 10/2004 | Koizumi et al. | 362/545 |
| 2005/0111235 A1 * | 5/2005 | Suzuki et al. | 362/555 |
| 2005/0146893 A1 * | 7/2005 | Ford et al. | 362/560 |
| 2007/0008734 A1 | 1/2007 | Bogner et al. | |

FOREIGN PATENT DOCUMENTS

| | | |
|---|---|---|
| DE | 198 60 697 | 8/2000 |
| DE | 101 43 544 | 4/2003 |
| DE | 102 31 325 | 2/2004 |
| DE | 102 56 179 | 6/2004 |
| DE | 103 14 524 | 10/2004 |
| JP | 02-015205 | 1/1990 |
| JP | 9-211232 | 8/1997 |
| WO | WO 2004/104476 | 12/2004 |

OTHER PUBLICATIONS

Japan Patent Office, "Preliminary Notice of Rejection", Jul. 7, 2009 (5 pages).

International Search Report for International Application No. PCT/DE2006/000868 dated Aug. 4, 2006.

State Intellectual Property Office, P.R. China, "Second Office Action", Application No. 200680026568.4, issued on Mar. 26, 2010 (3 pages).

* cited by examiner

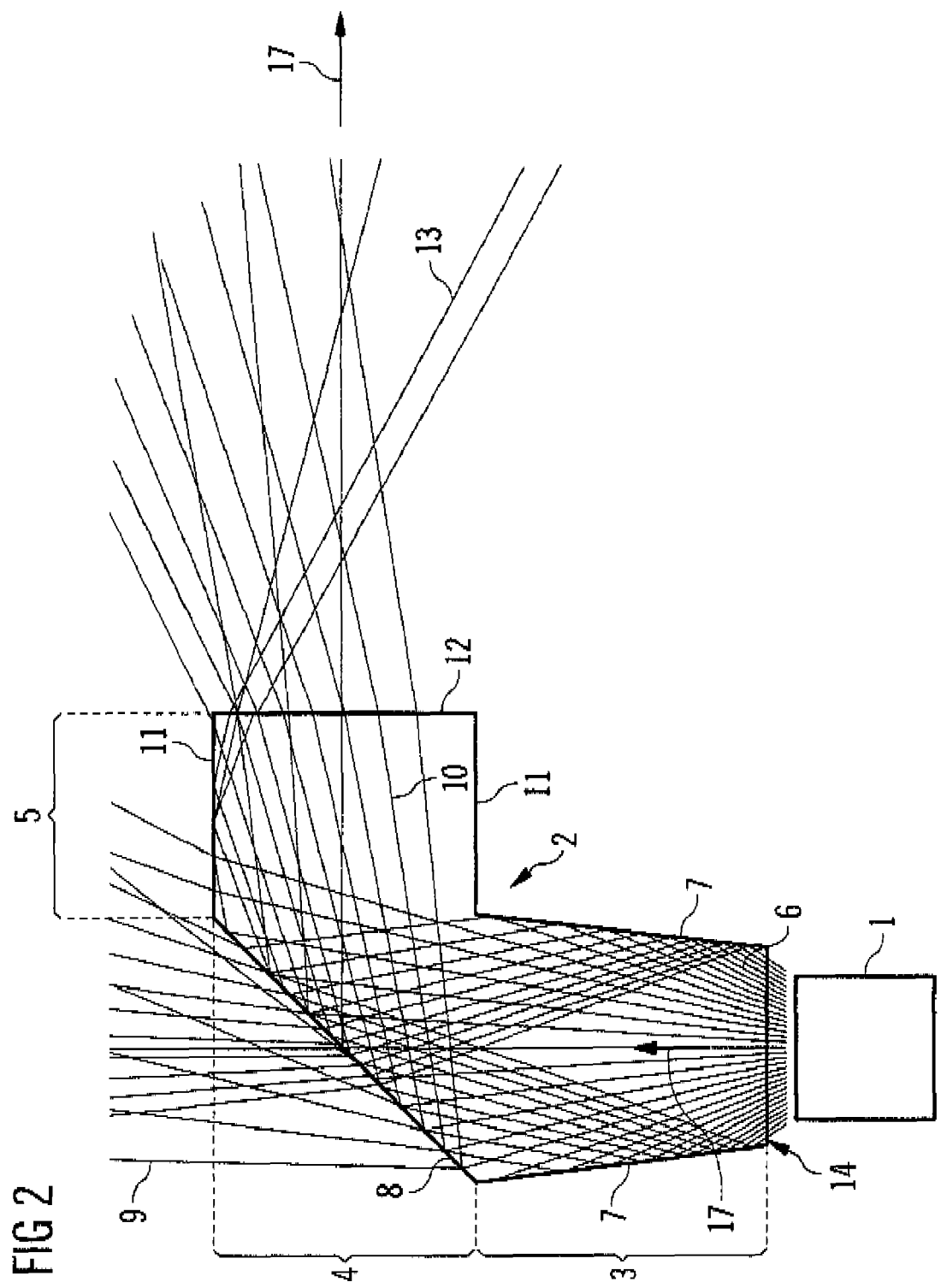

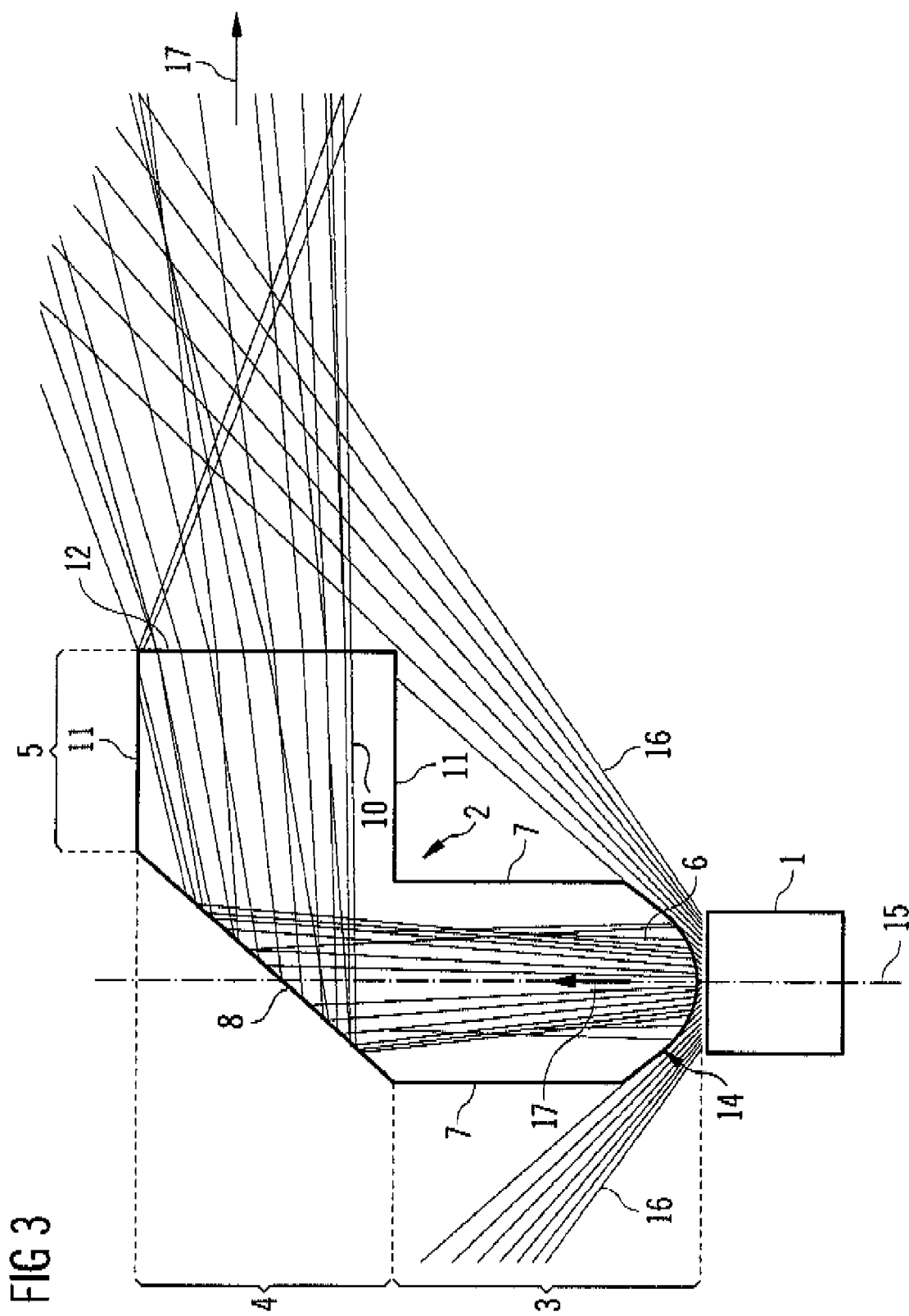

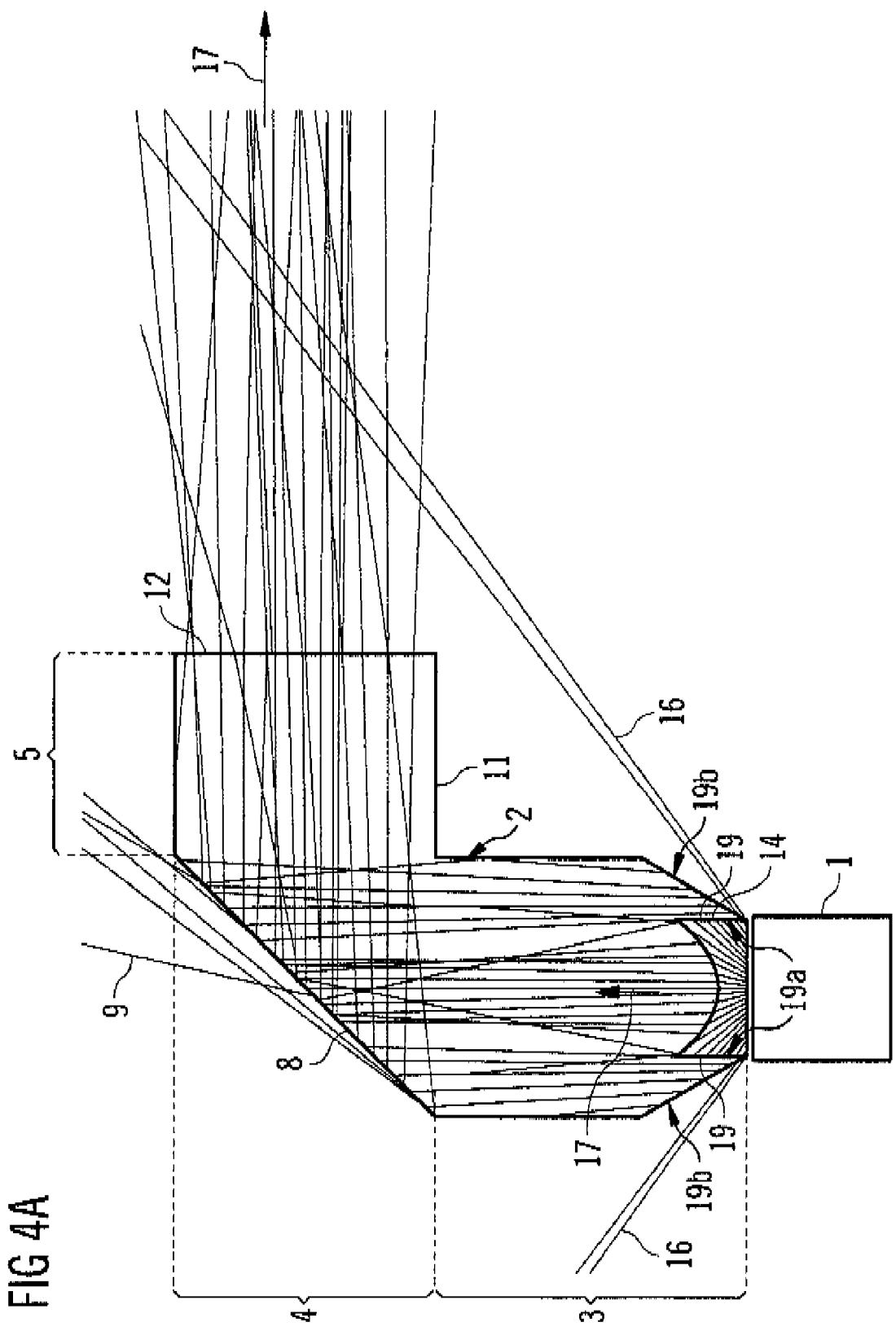

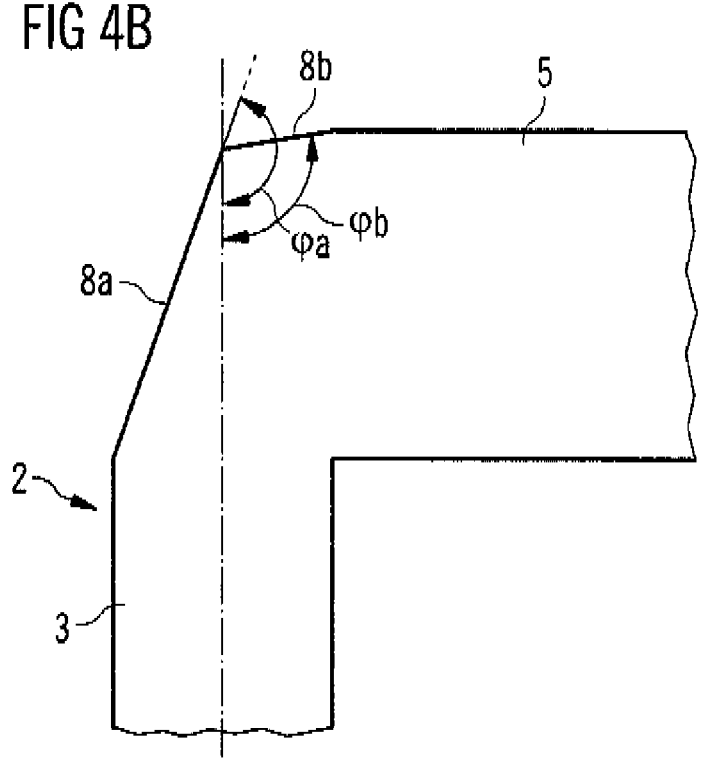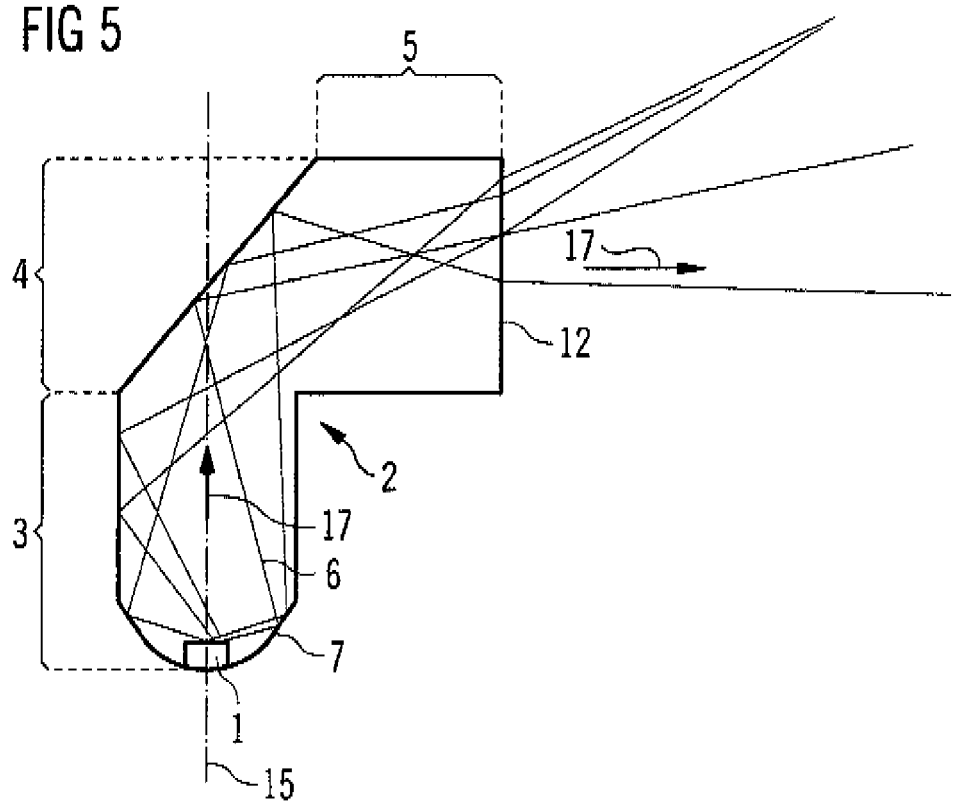

ILLUMINATION DEVICE

FIELD

An illumination device is specified.

SUMMARY

One object to be achieved consists in specifying an illumination device which can be produced in a particularly cost-effective manner.

In accordance with at least one embodiment, the illumination device has a light source suitable for generating electromagnetic radiation. That is to say that the light source emits electromagnetic radiation during operation. The light source is preferably suitable for generating divergent electromagnetic radiation, for example divergent visible light. Preferably, the light source is suitable for generating divergent white light.

In this case, divergent electromagnetic radiation is to be understood to mean a bundle of rays which has an angular distribution. That is to say that rays in the bundle of rays form angles with one another that are greater than zero.

The light source is preferably suitable for coupling at least part of the divergent radiation generated into an optical waveguide. For this purpose, the light source may be arranged outside the optical waveguide, for example, so that a radiation entrance area of the optical waveguide is arranged downstream of the light source. However, it is also possible for the light source or part of the light source to be arranged in the optical waveguide, so that the electromagnetic radiation is emitted directly in the optical waveguide.

In this case, an optical waveguide is to be understood to mean an optical element which is suitable for guiding electromagnetic radiation from one location to another location. In particular, the optical waveguide is not a radiation-generating optical element, but rather a passive optical element. In this case, the electromagnetic radiation is preferably guided by reflections at the side areas delimiting the optical waveguide.

In accordance with at least one embodiment of the illumination device, the electromagnetic radiation is guided in the optical waveguide on the basis of total reflections at the side areas delimiting the optical waveguide. The electromagnetic radiation is particularly preferably guided exclusively on the basis of total reflection. That is to say that if the electromagnetic radiation that is incident on the side areas of the optical waveguide does not meet the condition for total reflection, the radiation emerges from the optical waveguide into the optically less dense medium surrounding the optical waveguide.

In accordance with at least one embodiment of the illumination device, the optical waveguide is suitable for changing the main radiating direction of the electromagnetic radiation. In this case, main radiating direction is to be understood to mean a preferred direction of the radiation. By way of example, said preferred direction runs parallel to a longitudinal axis of the optical waveguide or a portion of the optical waveguide. In this case, the main radiating direction may also run perpendicular to a radiation exit area of the light source. That is to say that the main radiating direction runs along the optical axis of the light source.

The optical waveguide is suitable for changing the main radiating direction by reflection, for example. That is to say that the direction of a large part of the electromagnetic radiation in the optical waveguide is changed by reflection, preferably total reflection. The optical waveguide is preferably suitable for changing the main radiating direction in a defined manner. This means that the main radiating direction is changed by a specific, predeterminable angular magnitude upon passing through the optical waveguide.

In accordance with at least one embodiment, the optical waveguide is formed in one piece. That is to say that the optical waveguide is not composed of a plurality of parts, but rather is produced from one piece. For this purpose, the optical waveguide may be produced for example by means of an injection-moulding method.

In accordance with at least one embodiment, an illumination device is specified which has a light source suitable for coupling divergent radiation into an optical waveguide. In the optical waveguide, the radiation is guided on the basis of total reflection. The optical waveguide is suitable for changing the main radiating direction of the radiation. The optical waveguide is furthermore formed in one piece. That is to say that an illumination device is specified in which the light source couples divergent radiation into a one-part optical waveguide and the radiation is guided in the optical waveguide preferably solely on the basis of total reflection.

In this case, the illumination device makes use, inter alia, of the idea that in the case of an optical waveguide in which the electromagnetic radiation is guided in the optical waveguide solely on the basis of total reflection, it is possible to dispense with a complicated and thus expensive reflective coating of parts of the surface of the optical waveguide. Furthermore, the one-piece production of the optical waveguide enables a particularly cost-effective production method such as e.g. injection-moulding of the optical waveguide. Adapting the optical waveguide to guiding divergent electromagnetic radiation permits the use of particularly cost-effective light sources, such as light-emitting diodes for example, without special optics for reducing the divergence of the emitted light.

In accordance with at least one embodiment, the optical waveguide has a first portion suitable for reducing the divergence of the electromagnetic radiation passing through it. By way of example, the first portion of the optical waveguide is arranged directly downstream of a radiation entrance area or the light source. The first portion is preferably suitable for reducing the divergence of the electromagnetic radiation passing through it without appreciably altering the main radiating direction of the radiation in the process. The divergence may be reduced for example by means of reflection at side areas of the optical waveguide which delimit the first portion of the optical waveguide. That is to say that the first portion of the optical waveguide preferably has side areas which are suitable for the reflection of the electromagnetic radiation, preferably by means of total reflection. Particularly divergent radiation—for example radiation in the marginal regions of a divergent bundle of rays—which does not meet the condition for total reflection can leave the optical waveguide through the side areas. In this way, too, the divergence of the radiation remaining in the optical waveguide is effectively reduced.

In accordance with at least one embodiment of the illumination device, the optical waveguide has at least one planar side area in the first portion. That is to say that the planar side area has no macroscopic curvature. The side area may, by way of example, run parallel to the longitudinal axis of the first portion of the optical waveguide. The first portion of the optical waveguide may have for example the form of a parallelepiped delimited by planar side walls of the optical waveguide. It is also possible, however, for the side area to form an angle with the longitudinal axis. The optical waveguide then preferably tapers in the direction of the light source. The first portion may then have the form of a truncated pyramid, by way of example.

In accordance with at least one embodiment, the first portion of the optical waveguide has at least one curved side area. The first portion may be formed for example as a truncated cone. However, it is also possible for the side area to have a curvature in one section, for example in the direction of the longitudinal axis of the first portion of the optical waveguide. The optical waveguide may then be embodied in the manner of at least one of the following optical elements at least in places in the first portion: compound parabolic concentrator (CPC), compound elliptic concentrator (CEC), compound hyperbolic concentrator (CHC). In this case, the first portion preferably tapers in the direction of the light source, so that the divergence of the electromagnetic radiation is reduced upon passing through the optical waveguide on account of total reflections at the side areas of the optical waveguide.

In accordance with at least one embodiment, the first portion of the optical waveguide guides the electromagnetic radiation into a second portion of the optical waveguide. The second portion of the optical waveguide is preferably directly adjacent to the first portion in the main radiating direction. The first and second portions of the optical waveguide are preferably formed in one piece.

In accordance with at least one embodiment of the illumination device, the optical waveguide additionally has a second portion suitable for changing the main radiating direction of the electromagnetic radiation in the optical waveguide. That is to say that the second portion is formed in such a way that it is suitable for deflecting at least part of the electromagnetic radiation in the optical waveguide. In this case, the change in direction is preferably effected by means of reflection of the electromagnetic radiation at a side area of the optical waveguide that delimits the second portion, particularly preferably by total reflection.

In accordance with at least one embodiment of the illumination device, the optical waveguide has a deflection area in the second portion. The deflection area is preferably suitable for reflecting at least part of the electromagnetic radiation in the optical waveguide, for example electromagnetic radiation arriving from the first portion. The deflection area is preferably provided by at least one side area of the optical waveguide that delimits the optical waveguide in the second portion. The reflection at the deflection area is preferably effected by means of total reflection. That is to say that a reflective coating of the deflection area can preferably be dispensed with.

The part of the electromagnetic radiation which impinges on the deflection area and does not meet the condition for total reflection emerges from the optical waveguide at the deflection area into the optically less dense medium—for example air surrounding the optical waveguide. Preferably, the majority of the electromagnetic radiation in the optical waveguide impinges on the deflection area upon passing through the optical waveguide.

In accordance with at least one embodiment of the illumination device, the deflection area intersects the longitudinal axis of the first portion of the optical waveguide. The deflection area preferably extends over the entire width of the first portion of the optical waveguide. The deflection area particularly preferably forms an angle of at least 90° with the longitudinal axis.

In accordance with at least one embodiment of the illumination device, the deflection area is formed in planar fashion. That is to say that the deflection area has no macroscopic curvature.

In accordance with at least one embodiment of the illumination device, the deflection area of the optical waveguide is formed in two parts. In the case of this embodiment, the deflection area may be formed in planar fashion. A first portion of the deflection area preferably forms a first angle with the longitudinal axis of the first portion of the optical waveguide. A second portion of the deflection area then forms a second angle with the longitudinal axis of the first portion of the optical waveguide. The deflection area then preferably comprises precisely these two portions, the first portion of the deflection area extending from a side area of the first portion of the optical waveguide to the longitudinal axis of the first portion and the second portion of the deflection area extending from the longitudinal axis of the first portion of the optical waveguide to a side area of a third portion of the optical waveguide. Preferably, the first angle is between 150° and 170°, preferably approximately 160°. The second angle is then preferably between 90° and 110°, preferably approximately 100°.

In accordance with at least one embodiment of the illumination device, the deflection area has a curvature, that is to say that the deflection area is curved concavely into the optical waveguide or convexly from the optical waveguide at least in places. In this case, it is possible, in particular, for the deflection area to have a convex or concave curvature over its entire extent.

By way of example, the deflection area has at least one of the following curvatures at least in places: parabolic, elliptic, spherical, aspherical. That is to say that the deflection area is then curved in section at least in places in the manner of a parabola, an ellipse, a circle or aspherically. In this case, the curvature may be convex from the optical waveguide or concave into the optical waveguide.

It is furthermore possible for the deflection area to be curved at least in places in the manner of a paraboloid, an ellipsoid, a sphere and/or an asphere of revolution. Furthermore, it is also possible for the deflection area to be provided by a freeform area which may have curvatures of different, higher orders. Particularly preferably, the deflection area is curved convexly from the optical waveguide and in this case has a surface curved in the manner of an ellipsoid.

In this case, the illumination device makes use, inter alia, of the idea that the configuration of the deflection area can result in a defined deflection of the electromagnetic radiation in the optical waveguide. That is to say that firstly the direction in which the electromagnetic radiation is deflected can be set by the configuration of the deflection area, and secondly the emission characteristic of the reflected light—that is to say for example the spatial intensity distribution of the reflected light—can be set in a targeted manner by the configuration of the deflection area. The shaping of the deflection area may, in particular, also be adapted to divergent radiation in the optical waveguide, so that a maximum proportion of the electromagnetic radiation impinging on the deflection area is subjected to total reflection at the latter. Electromagnetic radiation which impinges on the deflection area at undesired angles is transmitted there and leaves the optical waveguide.

In accordance with at least one embodiment of the illumination device, the second portion of the optical waveguide is suitable for rotating the main radiating direction through a predetermined angle. That is to say that electromagnetic radiation is reflected in a defined manner at the deflection area of the second portion, for example, so that the main radiating direction of the electromagnetic radiation arriving from the first portion is deflected in a predeterminable direction, that is to say by a predeterminable angle.

By way of example, the main radiating direction may be rotated through 90°. The electromagnetic radiation is guided from the second portion e.g. into a third portion of the optical waveguide.

In accordance with at least one embodiment of the illumination device, the optical waveguide has a third portion suitable for guiding the electromagnetic radiation in the optical waveguide to a radiation exit area of the optical waveguide. By way of example, the third portion of the optical waveguide is directly adjacent to the second portion. The second and third portions of the optical waveguide are then preferably formed in one piece.

In accordance with at least one embodiment of the illumination device, the third portion is suitable for reducing the divergence of the electromagnetic radiation passing through it. The third portion is preferably suitable for reducing the divergence of the electromagnetic radiation passing through it without appreciably altering the main radiating direction of the radiation in the process. The reduction of the divergence may be effected for example by means of reflection at side areas of the optical waveguide which delimit the third portion of the optical waveguide. That is to say that the third portion of the optical waveguide preferably has side areas which are suitable for the reflection of the electromagnetic radiation, preferably by means of total reflection. Particularly divergent radiation which does not meet the condition for total reflection can leave the optical waveguide through the side areas, so that in this way, too, the divergence of the radiation remaining in the optical waveguide is effectively reduced.

In accordance with at least one embodiment of the illumination device, the optical waveguide has at least one planar side area in the third portion. That is to say that the planar side area has no macroscopic curvature. The side area may, by way of example, run parallel to the longitudinal axis of the third portion of the optical waveguide.

The third portion of the optical waveguide may have the form of a parallelepiped, by way of example. However, it is also possible for the side area to form an angle with the longitudinal axis of the third portion. The optical waveguide then preferably widens in the direction of the radiation exit area of the optical waveguide. The third portion may have e.g. the form of a truncated pyramid.

In accordance with at least one embodiment, the third portion of the optical waveguide has at least one curved side area. The third portion may be formed as a truncated cone, for example, which widens for example towards the radiation exit area.

However, it is also possible for the side area to have a curvature in a section through the optical waveguide, for example in the direction of the longitudinal axis of the third portion of the optical waveguide. The optical waveguide may then be embodied in the manner of at least one of the following optical elements at least in places in the third portion: compound parabolic concentrator (CPC), compound elliptic concentrator (CEC), compound hyperbolic concentrator (CHC). In this case, the third portion preferably tapers in the direction of the second portion, so that the divergence of the electromagnetic radiation is reduced upon passing through the optical waveguide on account of total reflections at the side areas of the optical waveguide. In this case, the third portion of the optical waveguide is preferably embodied with a length such that a sufficient intermixing of the radiation passing through it is ensured. The third portion thereby ensures that the light source is not imaged at the radiation exit area of the third portion. That is to say that no hot spots are to occur at the radiation exit area of the third portion, rather the electromagnetic radiation is to be distributed as uniformly as possible over the radiation exit area.

In accordance with at least one embodiment, the third portion of the optical waveguide guides the electromagnetic radiation to a radiation exit area of the optical waveguide. However, it is also possible for the third portion of the optical waveguide to be followed by one or more further portions which may be formed in a manner similar to the first portion or in a manner similar to the second portion of the optical waveguide. That is to say that the further portions of the optical waveguide may be suitable for reducing the divergence and/or deflecting the main radiating direction.

In accordance with at least one embodiment of the illumination device, the optical waveguide has a radiation exit area, through which at least part of the electromagnetic radiation coupled into the optical waveguide emerges from the latter again. Electromagnetic radiation emerging through the radiation exit area leaves the optical waveguide at a location provided for the light to emerge. Although it is possible for radiation to leave the optical waveguide also at locations other than the radiation exit area, for example that radiation which, upon impinging on one of the side areas of the optical waveguide, does not meet the condition for total reflection, the radiation exit area nevertheless represents the area of the optical waveguide which is provided for the light to emerge. Preferably, a large part of the electromagnetic radiation coupled into the optical waveguide emerges from the optical waveguide through the radiation exit area. The area to be illuminated by the illumination device or the object to be illuminated by the illumination device is preferably arranged downstream of the radiation exit area. It is also possible for the radiation exit area to adjoin the radiation entrance area of a further optical waveguide, for example.

In accordance with at least one embodiment of the illumination device, the radiation exit area is formed in planar fashion. That is to say that the radiation exit area has no macroscopic unevennesses or curvatures.

In accordance with at least one embodiment, the radiation exit area has a macroscopic curvature at least in places. In this case, the radiation exit area may be curved either convexly from the optical waveguide or concavely into the optical waveguide. By way of example, the radiation exit area may have one of the following curvatures: spherical, aspherical, elliptic. The radiation exit area may also be formed in the manner of one of the following optical elements volume lens suitable for light scattering or light gathering, Fresnel lens. In this case, the radiation exit area is preferably formed in one piece with the optical waveguide.

The radiation exit area is particularly preferably arranged directly downstream of the third portion of the optical waveguide, so that a large part of the radiation, in the third portion of the optical waveguide, leaves the latter through the radiation exit area.

In accordance with at least one embodiment of the illumination device, the radiation exit area is formed such that it effects diffuse scattering, that is to say that electromagnetic radiation which passes through the radiation exit area is deflected in different directions for example by light refraction. The radiation exit area is preferably roughened for this purpose. The probability of total reflection of radiation from the optical waveguide at the radiation exit area is also reduced in this way. The roughening thus also increases the probability of a radiation exit through the radiation exit area. It is moreover also possible, however, for the radiation exit area to be coated such that it effects diffuse scattering.

In this case, the illumination device makes use, inter alia, of the idea that the coupling of the radiation passing through the radiation exit area into a further optical waveguide, for example an optical waveguide configured in plane fashion, is effected particularly efficiently there if the emerging radiation has a certain divergence. The plane optical waveguide may for example form a surface luminous system comprising an area through which electromagnetic radiation can emerge. By way of example, the plane optical waveguide is provided for the backlighting of a display. By way of example, the document DE 19860697, the disclosure content of which with regard to a flat optical waveguide module is hereby incorporated by reference, describes such a plane optical waveguide.

In accordance with at least one embodiment the optical waveguide of the illumination device is formed as a solid body, that is to say that the side areas delimiting the optical waveguide are formed by the surfaces of the solid body, by way of example. The solid body is preferably free of cavities. That is to say that the solid body preferably contains no voids, that is to say for example no inclusions of gas.

The solid body is particularly preferably formed from a transparent material. However, it is also possible for the optical waveguide to be formed from a material that scatters light diffusely.

In accordance with at least one embodiment, the material from which the optical waveguide is formed has a refractive index of at least 1.0, particularly preferably of at least 1.3.

By way of example, the optical waveguide is formed from one of the following transparent plastics or contains one of the following plastics: PMMA, polycarbonate, PMMI, COC. The optical waveguide is preferably produced by an injection-moulding process, that is to say that the optical waveguide is injection-moulded. However, the optical waveguide may also be formed from a glass. In this case, the optical waveguide may for example be cast from a glass.

In accordance with at least one embodiment of the illumination device, the light source is arranged in the optical waveguide. In this case, the light source is preferably arranged in the first portion of the optical waveguide. The light source is preferably suitable for generating divergent electromagnetic radiation. The main radiating direction of the electromagnetic radiation that is emitted by the light source during operation preferably runs parallel to a longitudinal axis of the first portion of the optical waveguide.

The light source is preferably at least one light-emitting diode or at least one light-emitting diode chip. For example, the light source comprises a plurality of light-emitting diodes or light-emitting diode chips which are arranged along a straight line in one plane.

In this case, the material of the optical waveguide may constitute at least part of the encapsulation composition with which the light-emitting diode chip is encapsulated. This means that the light-emitting diode chip is either encapsulated directly with the material of the optical waveguide—that is to say that the optical waveguide forms the encapsulation of the light-emitting diode chip—or the light-emitting diode chip is encapsulated with a different encapsulation material adjoining the material of the optical waveguide. Light source and optical waveguide are formed in one piece in these cases. For the case where the light source is arranged in the optical waveguide, it is possible for example to lead electrical connection locations for making electrical contact with the light source from the optical waveguide.

In accordance with at least one embodiment of the illumination device, the optical waveguide has a radiation entrance area. In this case, the light source is preferably arranged outside the optical waveguide. The radiation entrance area is preferably arranged downstream of the light source in the main radiating direction. In this case, a radiation coupling-out area of the light source may either directly adjoin the radiation entrance area of the optical waveguide or a gap, filled with air for example, is situated between the light source and the radiation entrance area of the optical waveguide.

In accordance with at least one embodiment, the radiation entrance area is provided for optically refracting at least part of the electromagnetic radiation emitted by the light source upon entering into the optical waveguide. In this case, the radiation that enters is preferably refracted at least in part towards the longitudinal axis of the first portion of the optical waveguide. The longitudinal axis is the axis of symmetry of the first portion of the optical waveguide in the longitudinal direction.

The radiation entrance area is preferably suitable for reducing the divergence of the electromagnetic radiation passing through it by means of refraction. For this purpose, the radiation entrance area may be formed in planar fashion, by way of example.

In accordance with at least one embodiment of the illumination device, the radiation entrance area has a curvature. That is to say that the radiation entrance area is macroscopically curved. In this case, the radiation entrance area may be curved convexly from the optical waveguide or concavely into the optical waveguide. It is furthermore possible for the radiation entrance area to have both convexly and concavely curved partial regions.

In accordance with at least one embodiment of the illumination device, the radiation entrance area has at least one of the following curvatures: spherical, elliptic, aspherical.

The radiation entrance area may be formed at least in part in the manner of one of the following optical elements: spherically curved volume lens, aspherically curved volume lens, Fresnel lens. In this case, the optical element is preferably formed from the material of the optical waveguide and formed in one piece with the optical waveguide.

In accordance with at least one embodiment, the radiation entrance area is curved from the optical waveguide in the manner of a spherical or aspherical lens in a central region of the radiation entrance area surrounding the longitudinal axis of the first portion.

In accordance with at least one embodiment of the illumination device, at least one annular reflector is arranged around the central region of the radiation entrance area. The reflector ring is formed in sawtooth-shaped fashion, for example in a section through the optical waveguide parallel to the longitudinal axis. The radiation entrance area then has both reflective and refractive optical elements.

In accordance with at least one embodiment of the illumination device, the light source comprises at least one light-emitting diode chip. The light-emitting diode chip is preferably a light-emitting diode chip of thin film design.

The light source particularly preferably comprises a plurality of light-emitting diodes which are arranged for example along a straight line in one plane.

In accordance with at least one embodiment, the light source has a diffusely directed emission characteristic. That is to say that the radiation emitted by the light source during operation has a main emission direction in which the emitted radiation has the greatest intensity. Electromagnetic radiation having a lower intensity is emitted in other directions.

In accordance with at least one embodiment of the illumination device, the light source has an approximately Lambertian emission characteristic. The electromagnetic radiation is emitted by the light source preferably into a hemisphere surrounding the light source. The main emission direction is provided for example by the perpendicular to the radiation exit area of the light-emitting diode chip.

There is specified, furthermore, a surface luminous system comprising an illumination device according to at least one of the embodiments described above which additionally comprises a plane optical waveguide. The surface luminous system is particularly well suited to the backlighting of displays and as ambient light.

The use of the illumination device according to at least one of the embodiments described above for the backlighting of a display is furthermore specified. In this case, the radiation emitted by the light source is coupled by means of the optical waveguide into a further, plane optical waveguide, by way of example. The plane optical waveguide constitutes a surface luminous system which may be used for example for the backlighting of displays such as liquid crystal displays (LCD displays).

In this case, the illumination device makes use, inter alia, of the idea that a surface-mountable light-emitting diode that emits away from the mounting plane (top emitter) with a main radiating direction for example perpendicular to the mounting plane can be used as the light source. This permits a circuit board to be populated as simply as possible with top emitters whose light is coupled into the plane optical waveguide by means of the optical waveguide. The length of the optical waveguide, that is to say the length of the portions of the optical waveguide, may be adapted to the height of the plane optical waveguide above the circuit board.

A plurality of the illumination devices described are preferably used for coupling light into the plane optical waveguide and thus for display backlighting. In particular, it is also possible in this case for the plane optical waveguide and the optical waveguide of the illumination device to be formed in one piece.

In addition to the optical solution described whereby light from a top emitting light-emitting diode is coupled into a plane optical waveguide, mechanical solutions are also possible. The top emitters may e.g. be soldered onto a circuit board such as e.g. a printed circuit board (PCB) or a flexible circuit board (flexboard). After soldering, the strip of the circuit board on which the light-emitting diodes are mounted may be cut free and folded up and installed depending on the height of the plane optical waveguide above the circuit board. In this way, the light-emitting diodes emit their light laterally, that is to say parallel to the mounting plane, and are adapted to the plane optical waveguide in terms of their height. In order to ensure the position of the light-emitting diodes mounted in this way even in the event of mechanical stress, the installed region of the circuit board is connected to the plane optical waveguide by means of a holding device, such as clips for example, applied to the circuit board.

The illumination device described here is explained in more detail below on the basis of exemplary embodiments and the associated figures.

DESCRIPTION OF DRAWINGS

FIG. 2 shows a schematic sectional illustration of a second exemplary embodiment of the illumination device described here.

FIG. 3 shows a schematic sectional illustration of a third exemplary embodiment of the illumination device described here.

FIG. 4A shows a schematic sectional illustration of a fourth exemplary embodiment of the illumination device described here.

FIG. 4B shows a schematic sectional illustration of a modification of the fourth exemplary embodiment of the illumination device described here.

FIG. 5 shows a schematic sectional illustration of a fifth exemplary embodiment of the illumination device described here.

In the exemplary embodiments of the figures, identical or identically acting constituent parts are in each case provided with the same reference symbols. The elements illustrated are not to be regarded as true to scale, rather individual elements may be illustrated with an exaggerated size in order to afford a better understanding.

DETAILED DESCRIPTION

Figure 1:
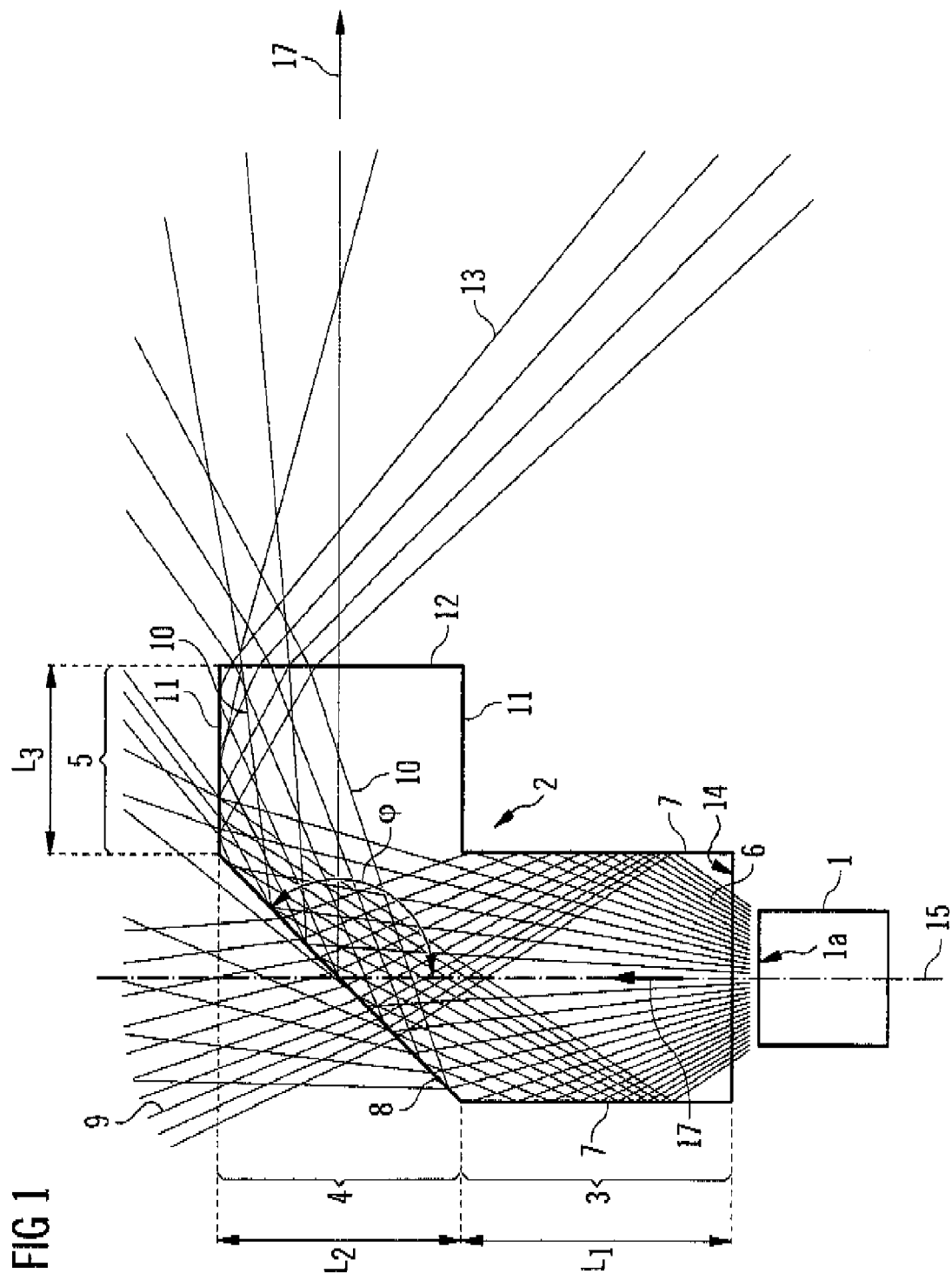
FIG. 1 shows a schematic sectional illustration of a first exemplary embodiment of the illumination device described here.

FIG. 1 shows a first exemplary embodiment of the illumination device described here. The illumination device comprises a light source 1 and an optical waveguide 2.

The light source 1 is for example one or a plurality of light-emitting diodes each comprising at least one light-emitting diode chip. By way of example, the light source 1 is a plurality of light-emitting diodes which are arranged along a straight line in one plane (in this respect/also see FIG. 6). The radiation entrance area 14 of the optical waveguide 2 is adapted to the dimensioning of the light-emitting diodes in terms of its width. The width of the optical waveguide 2 is approximately 4 to 7 mm at the radiation entrance area 14.

The light-emitting diode chip preferably has a light coupling-out area, through which a large part of the electromagnetic radiation emitted by the light-emitting diode chip is coupled out. The light coupling-out area is provided for example by part of the surface of the light-emitting diode chip. The light coupling-out area is preferably provided by a main area of the light-emitting diode chip which, by way of example, is arranged parallel to an epitaxial layer sequence of the light-emitting diode chip, said layer sequence being suitable for generating electromagnetic radiation.

For this purpose, the epitaxial layer sequence may have for example a pn junction, a double heterostructure, a single quantum well structure or particularly preferably a multiple quantum well structure. In the context of the application, the designation quantum well structure encompasses any structure in which charge carriers experience a quantization of their energy states as a result of confinement. In particular, the designation quantum well structure does not comprise any indication about the dimensionality of the quantization. Consequently, it encompasses, inter alia, quantum wells, quantum wires and quantum dots and any combination of these structures.

The light-emitting diode chip is preferably a semiconductor light-emitting diode chip in which the growth substrate is at least thinned or removed and on whose surface remote from the original growth substrate a carrier element is applied.

The carrier element may be chosen relatively freely compared with a growth substrate. Preferably, a carrier element is chosen which, with regard to its coefficient of thermal expansion, is matched particularly well to the radiation-generating epitaxial layer sequence. The carrier element may further contain a material which exhibits particularly good thermal conductivity. In this way, the heat generated by the light-emitting diode chip during operation is dissipated to the heat conducting element particularly efficiently.

Such light-emitting diode chips produced by the removal of the growth substrate are also referred to as thin-film light-emitting diode chips and are preferably distinguished by the following features:

A reflective layer or layer sequence which reflects at least part of the electromagnetic radiation generated in the epitaxial layer sequence back into the latter is applied or formed at a first main area of the radiation-generating epitaxial layer sequence that faces the carrier element.

The epitaxial layer sequence preferably has a thickness of at most twenty micrometers, particularly preferably of at most ten micrometers.

The epitaxial layer sequence furthermore preferably contains at least one semiconductor layer having at least one area which has an intermixing structure. Said intermixing structure ideally leads to an approximately ergodic distribution of the light in the epitaxial layer sequence, that is to say it has an as far as possible ergodically stochastic scattering behaviour.

A basic principle of a thin-film light-emitting diode chip is described for example in the document Schnitzer I. et al., "30% external quantum efficiency from surface textured LEDs", Applied Physics Letters, October 1993, Vol. 63, pages 2174-2176, the disclosure content of which, relating to the basic principle of a thin-film light-emitting diode chip, is hereby incorporated by reference.

The light source 1 has a radiation exit area 1a, through which a large part of the electromagnetic radiation generated in the light source leaves the light source.

The light source 1 and optical waveguide 2 are arranged at a distance from one another in the exemplary embodiment of FIG. 1. That is to say that a gap, which may be filled with air for example, is situated between the radiation coupling-out area 1a of the light source 1 and the radiation entrance area 14 of the optical waveguide 2. However, it is also possible for the radiation exit area 1a of the light source 1 to directly adjoin the radiation entrance area 14 of the optical waveguide. The light source 1 and optical waveguide 2 may be formed in one piece in this case.

The light source 1 and optical waveguide 2 are arranged for example in a manner centred with respect to one another. That is to say that the longitudinal axis 15 of the first portion 3 of the optical waveguide 2, which constitutes an axis of symmetry of the first portion 3 of the optical waveguide 2 in the longitudinal direction, runs through the geometric centre 1a of the light source 1.

The longitudinal axis 15 preferably coincides with the optical axis of the lens formed by the radiation entrance area 14 of the optical waveguide 2. The main radiating direction 17 of the electromagnetic radiation 6 in the optical waveguide preferably runs parallel to the longitudinal axis 15.

The light source 1 and optical waveguide 2 are for example in each case mechanically fixed and contact-connected on a board or a circuit board, such as, for example, a metal-core board or a printed circuit board (PCB). However, it is also possible for the optical waveguide 2 to be fixed to the light source 1. It is furthermore possible for the optical waveguide 2 to be fixed to a further, for example plane, optical waveguide (not illustrated in FIG. 1), which, for its part, may be fixed on the board or the circuit board.

The light source 1 is suitable for generating divergent electromagnetic radiation 6. That is to say that the electromagnetic radiation which leaves the light source 1 has an angular distribution. The rays 6 do not in each case run parallel to one another, but rather form angles with respect to one another. Upon passing through the radiation entrance area 14 of the optical waveguide 2, the electromagnetic radiation is preferably refracted in the direction towards the longitudinal axis 15.

In the exemplary embodiment of FIG. 1, the radiation entrance area 14 is provided by a planar area having no macroscopic unevennesses or curvatures.

The optical waveguide 2 is preferably a solid body formed from a heat-resistant dielectric material. By way of example, the optical waveguide 2 comprises one of the following materials; PMMA, PMMI, polycarbonate, COC or glass. The optical waveguide is preferably transparent to the electromagnetic radiation 6 emitted by the light source 1. The radiation 6 is preferably light in the visible frequency range. In this frequency range, the refractive index of the material of the optical waveguide is preferably at least 1.3, particularly preferably between 1.4 and 1.7.

The optical waveguide 2 is preferably formed in a manner free of cavities. That is to say that the optical waveguide 2 is preferably formed in one piece, without having air inclusions in this case.

The optical waveguide 2 is preferably formed in one piece. The optical waveguide is particularly preferably produced by means of injection moulding. The optical waveguide 2 and integrated coupling-in optic 14 can then preferably be produced jointly as a single injection-moulded part.

The electromagnetic radiation 6 is situated firstly in the first portion 3 of the optical waveguide 2. In the exemplary embodiment of FIG. 3, the first portion 3 is delimited by planar side areas 7 running parallel to the longitudinal axis 15. In this exemplary embodiment, the first portion 3 of the optical waveguide 2 has for example the form of a parallelepiped having the length $L_1$.

At least part of the electromagnetic radiation 6 in the optical waveguide 2 is reflected at the side areas 7 by means of total reflection. Rays which do not meet the condition for total reflection leave the optical waveguide 2 through the side areas 7.

The electromagnetic radiation passes from the first portion 3 into the second portion 4 of the optical waveguide, which is preferably arranged directly downstream of the first portion 3 and formed in one piece with the latter.

The second portion 4 of the optical waveguide 2 is delimited by a deflection area 8 formed by part of the surface of the optical waveguide 2 in the second portion 4. In the exemplary embodiment of FIG. 1, the deflection area 8 is formed in planar fashion. However, it is also possible for the deflection area 8 to have a curvature, as described for example in the general part of the description.

In the exemplary embodiment of FIG. 1, the deflection area 8 extends over the entire lateral extent of the optical waveguide transversely with respect to the direction of the longitudinal axis 15. The deflection area 8 forms an angle φ of at least 90° with the longitudinal axis 15. In the exemplary embodiment of FIG. 1, the angle φ is approximately 135°. The angle φ is preferably between 100 and 170°.

On account of the fact that the deflection area 8 extends over the entire lateral extent of the first portion 3 of the optical waveguide, a large part of the electromagnetic radiation 6 in the optical waveguide 2 impinges on the deflection area 8. Rays 9 which do not meet the condition for total reflection there leave the optical waveguide 2 through the deflection area 8. That part of the radiation 10 which remains in the optical waveguide 2 is reflected at the deflection area 8 into a third portion 5 of the optical waveguide 2. However, part of the electromagnetic radiation 6 may also be reflected directly into the third portion 5 of the optical waveguide 2 by means of reflection at the side areas 7 of the first portion 3.

The third portion 5 of the optical waveguide 2 has a length of $L_3$. In this case, the length of the third portion of the optical waveguide 2 is chosen to be long enough such that no hot spot occurs at the radiation exit area 12 of the optical waveguide 2.

In the exemplary embodiment shown in FIG. 1, the third portion 5 is delimited by planar side areas 11. In this case, the third portion 5 has the form of a parallelepiped, by way of example. However, it is also possible for the third portion 5 to have the form of a truncated pyramid or truncated cone which widens in the direction of a radiation exit area 12. It is furthermore possible for the third portion 5 of the optical waveguide 2 to be formed in the manner of one of the following optical elements at least in places: CPC, CEC, CHC. In this case, too, the optical waveguide preferably widens in the direction of the radiation exit area 12.

The main radiating direction 17 of the electromagnetic radiation in the optical waveguide 2 is changed in the second portion 4. After passing through the second portion 4 of the optical waveguide 2, the main radiating direction 17 no longer runs parallel to the longitudinal axis 15, but rather runs transversely, for example perpendicular, to the radiation exit area 12 of the optical waveguide 2.

FIG. 2 shows a second exemplary embodiment of the illumination device described here.

In contrast to the exemplary embodiment of FIG. 1, the side areas 7 of the first portion 3 of the optical waveguide 2 in this exemplary embodiment form an angle with the longitudinal axis 15 of the optical waveguide 2. The optical waveguide 2 tapers in the first portion 3 with respect to the light source 1. The side areas may be formed in planar fashion in this case. The first portion may then have for example the form of a truncated cone or truncated pyramid. It is furthermore possible for the first portion to be formed in the manner of at least one of the following optical elements at least in places: CPC, CHC, CEC. In this case, too, the optical waveguide 2 preferably tapers in the direction of the light source 1.

The configuration of the first portion 3 preferably permits a more effective reduction of the divergence of the electromagnetic radiation passing through the first portion 3 than is the case for example in the exemplary embodiment of FIG. 1. It is furthermore possible for the reflection of the radiation 6 impinging on the side areas 7 to be effected, on account of the configuration of the side areas 7, at angles such that a larger proportion of the reflected radiation meets the condition for total reflection at the deflection area 8. The radiance of the radiation 13 emerging through the radiation exit area 12 can be increased in this way.

FIG. 3 shows a third exemplary embodiment of the illumination device described here. In contrast to the exemplary embodiments of FIGS. 1 and 2, the optical waveguide 2 in this exemplary embodiment has a radiation entrance area 14 curved convexly towards the light source 1. The radiation entrance area 14 may have a spherical, elliptic or aspherical curvature at least in places. By way of example, the radiation entrance area 14 is shaped in the manner of a spherical, elliptic or aspherical lens. On account of the configuration of the radiation entrance area 14, in the exemplary embodiment of FIG. 3, electromagnetic radiation entering into the optical waveguide 2 through the radiation entrance area 14 is refracted particularly effectively in the direction of the longitudinal axis 15 of the first portion 3 of the optical waveguide 2. The optical axis of the lens shaped by the radiation entrance area coincides with the longitudinal axis 15, by way of example. The lens may be embodied radially symmetrically, for example in a manner centred with respect to the light source 1. The lens may be embodied in an extruded manner, with a concentrating effect only in a direction perpendicular to the extrusion direction. It is furthermore possible for the lens also to be embodied as a Fresnel lens besides the continuous curve profile of its surface shown.

The radiation 6 is deflected in its direction upon passing through the radiation entrance area 14 in such a way that the condition for total reflection is met for a particularly large part of the radiation 6 that impinges on the deflection area 8. Particularly divergent radiation 16 does not enter into the optical waveguide 2 on account of the configuration of the radiation entrance area 14.

FIG. 4A shows a fourth exemplary embodiment of the illumination device described here.

In this exemplary embodiment, the radiation entrance area 14 is subdivided into a central region 18 and edge regions 19. The longitudinal axis 15 runs centrally through the central region 18. In the central region 18, the surface is shaped spherically, elliptically or aspherically in the manner of a lens. The electromagnetic radiation 6 passing through the radiation entrance area 14 in the central region 18 is imaged by refraction at the curved surface and refracted in the direction towards the longitudinal axis 15.

The central region 18 is surrounded by a reflector ring 19, which is sawtooth-shaped in section. The radiation impinging here is refracted at the inner area 19a of each edge region 19 and subjected to total reflection at the outer area 19b of each edge region 19. In this way, it is possible that, firstly, a particularly large proportion of the electromagnetic radiation emitted by the light source 1 can be coupled into the optical waveguide without any losses and, secondly, a particularly large proportion of the electromagnetic radiation 6 situated in the optical waveguide 2 meets the condition for total reflection at the deflection area 8. This configuration of the optical waveguide thus permits a particularly high radiance at the radiation exit area 12 of the optical waveguide 2. The optical waveguide 2 is thus particularly well suited to guiding the divergent radiation 6 of the light source 1.

Electromagnetic radiation emerging at the radiation exit area 12 with particularly low divergence furthermore results. For the case where radiation with greater divergence is required at the radiation exit area 12, it is possible to form the radiation exit area 12 in diffusely scattering fashion. This may be done for example by means of roughening the radiation exit area 12. The probability of total reflection of radiation upon passing through the radiation exit area 12 is also advantageously reduced in this case. As an alternative, it is also possible to coat the radiation exit area with a diffusely scattering layer.

FIG. 4B shows a detail from the optical waveguide 2, in which the deflection area 8 is formed in two parts. In this case, the deflection area 8 has a first portion 8a, which forms an angle $\phi_a$ with the longitudinal axis 15, and a second portion 8b, which forms an angle $\phi_b$ with the longitudinal axis 15. Preferably, $\phi_a$ is chosen to be greater than $\phi_b$. By way of example, $\phi_a$ is between 150° and 170°, preferably approximately 160°, and $\phi_b$ is between 90° and 110°, preferably approximately 100°. Such a two-part configuration of the deflection area 8 is in particular also possible in the rest of the exemplary embodiments of the illumination device. In this case, it is also possible for the boundary line between the two portions not to coincide with the longitudinal axis 15, but rather to run parallel to the longitudinal axis 15 on the right or left of the latter.

FIG. 5 shows the illumination device described here in a fifth exemplary embodiment.

In contrast to the exemplary embodiments of FIGS. 1 to 4, in this exemplary embodiment the light source 1 is arranged at least partly in the optical waveguide 2. That is to say that the material—for example the transparent plastic—from which the optical waveguide 2 is formed at least partly encloses the light source 1.

The light source 1 may be for example at least one light-emitting diode chip as described further above. The light-emitting diode chip is then either encapsulated directly with the material of the optical waveguide 2 or the material of the optical waveguide 2 is directly adjacent to an encapsulation of the light-emitting diode chip. It is furthermore possible in this exemplary embodiment to lead electrical connection parts (not shown) of the light source 1 from the optical waveguide 2.

At least part of the radiation 6 emitted by the light source 1 firstly impinges on the side walls 7 in the first portion of the optical waveguide 2. In this case, as shown in FIG. 5, the side walls 7 may be formed at least in places in the manner of a CPC optic that tapers towards the light source 1. It is furthermore possible for the first portion to be formed in the manner of at least one of the following optical elements at least in places: truncated cone optic, truncated pyramid optic, CEC, CHC, CPC. In this case, the first portion 3 preferably tapers in the direction of the light source 1.

The divergence of the radiation 6 in the optical waveguide can be reduced particularly effectively in this way. A particularly large proportion of the radiation 6 in the optical waveguide 2 meets the condition for total reflection at the deflection area 8 in the second portion 4 of the optical waveguide 2.

Figure 6:
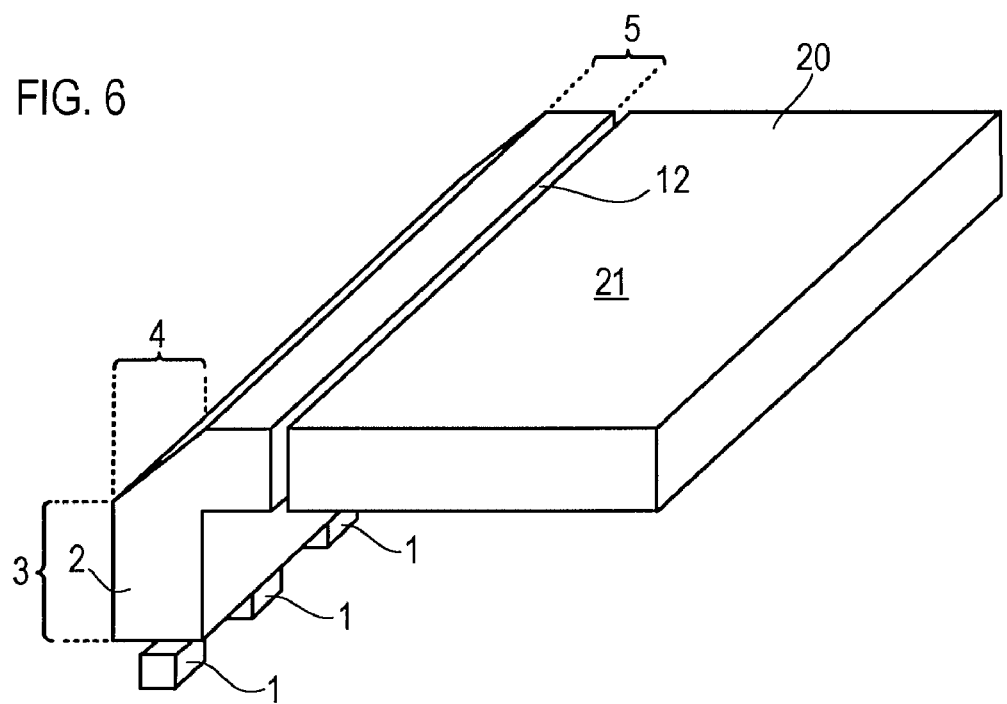
FIG. 6 shows a schematic perspective illustration of a surface luminous system.
Figure 7:
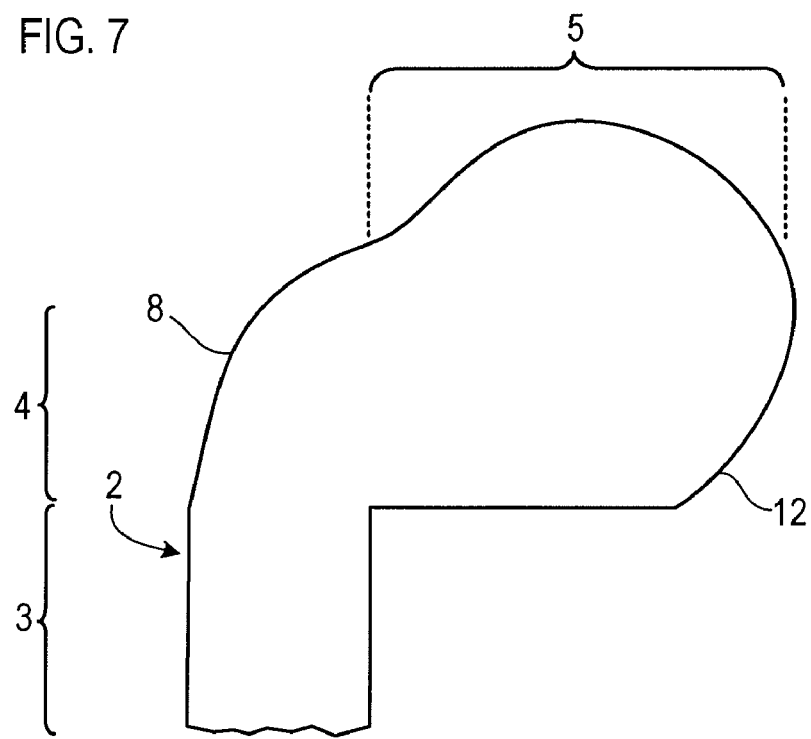
FIG. 7 shows a schematic sectional illustration of an exemplary embodiment of the illumination device described here.

FIG. 6 shows a schematic perspective illustration of a surface luminous system comprising light source 1, optical waveguide 2 and plane optical waveguide 20. The plane optical waveguide 20 is arranged at the radiation exit area 12 of the optical waveguide 2. The optical waveguide 2 is an optical waveguide in accordance with the exemplary embodiments described above. As illustrated in FIG. 6, a gap is arranged between optical waveguide 2 and plane optical waveguide 20. However, it is also possible for the two components to be formed integrally with one another.

The plane optical waveguide 20 preferably has a radiation exit area 21, which is provided for example by a top side of the plane optical waveguide 20. Electromagnetic radiation preferably emerges particularly uniformly through the radiation exit area 21, that is to say that the emerging radiation has no hot spots. The surface luminous system is then particularly well suited to display backlighting or as ambient light. Light guiding takes place in the plane optical waveguide 20 by means of reflection at the inner areas of the optical waveguide 20, which for this purpose may be configured for example in reflecting fashion or in diffusely reflecting fashion. The radiation exit area 21 may be formed for example such that it scatters light diffusely.

This patent application claims the priorities of German Patent Applications 102005024964.7 and 102005042523.2-54, the disclosure content of which is hereby incorporated by reference.

The invention is not restricted by the description on the basis of the exemplary embodiments. Rather, the invention encompasses any new feature and any combination of features, which in particular comprises any combination of features in the patent claims, even if this feature or this combination of features is itself not explicitly specified in the patent claims or exemplary embodiments.

The invention claimed is:

1. Illumination device, having
a light source which emits divergent electromagnetic radiation, said divergent electromagnetic radiation being coupled into an optical waveguide,
the electromagnetic radiation being guided in the optical waveguide on the basis of total reflection,
the optical waveguide being suitable for changing a main radiating direction of the electromagnetic radiation, and
the optical waveguide being formed in one piece, wherein
the optical waveguide has a radiation entrance area and a first portion suitable for reducing the divergence of the electromagnetic radiation passing through it,
the radiation entrance area arranged subsequent to the light source in the main radiating direction, and
the radiation entrance area is curved convexly from the optical waveguide at least in places.

2. Illumination device according to claim 1, in which the first portion has at least one planar side area.

3. Illumination device according to claim 1, in which the first portion has at least one curved side area.

4. Illumination device according to claim 1, in which the first portion is formed at least in places in the manner of one of the following optical elements: compound parabolic concentrator (CPC), compound hyperbolic concentrator (CHC), compound elliptic concentrator (CEC), truncated cone optic, truncated pyramid optic.

5. Illumination device according to claim 1, in which the first portion guides the electromagnetic radiation to a second portion of the optical waveguide.

6. Illumination device according to claim 1, in which the optical waveguide has a second portion suitable for changing the main radiating direction of the electromagnetic radiation.

7. Illumination device according to claim 6, in which the second portion has a deflection area suitable for reflecting at least part of the electromagnetic radiation in the optical waveguide.

8. Illumination device according to claim 7, in which a large part of the electromagnetic radiation arriving from the first portion impinges on the deflection area.

9. Illumination device according to claim 7, in which the deflection area intersects the longitudinal axis of the first portion.

10. Illumination device according to claim 7, in which the deflection area is formed in planar fashion.

11. Illumination device according to claim 7, in which the deflection area has a curvature.

12. Illumination device according to claim 11, in which the deflection area is curved convexly from the optical waveguide at least in places.

13. Illumination device according to claim 11, in which the deflection area has one of the following curvatures at least in places: parabolic, elliptic, spherical, aspherical.

14. Illumination device according to claim 7, in which the deflection area of the optical waveguide is formed in two parts.

15. Illumination device according to claim 14, in which the deflection area has a first planar portion, which forms a first angle ($\phi_a$) with the longitudinal axis of the first portion of the optical waveguide, and a second planar portion, which forms a second angle ($\phi_b$) with the longitudinal axis of the first portion of the optical waveguide, the first angle being greater than the second angle.

16. Illumination device according to claim 6, in which the second portion is suitable for changing a main radiating direction by a predeterminable angle.

17. Illumination device according to claim 16, in which the second portion is suitable for rotating the main radiating direction through a 90 degrees angle.

18. Illumination device according to claim 7, in which the second portion guides the electromagnetic radiation to a third portion of the optical waveguide.

19. Illumination device according to claim 5, in which the optical waveguide has a third portion suitable for guiding the electromagnetic radiation to a radiation exit area of the optical waveguide.

20. Illumination device according to claim 19, in which the third portion is suitable for reducing the divergence of the radiation passing through it.

21. Illumination device according to claim 19, in which the third portion has at least one planar side area.

22. Illumination device according to claim 19, in which the third portion has at least one curved side area.

23. Illumination device according to claim 19, in which the third portion is formed at least in places in the manner of one of the following optical elements: compound parabolic concentrator (CPC), compound elliptic concentrator (CEC), and compound hyperbolic concentrator (CHC), truncated cone optic, truncated pyramid optic.

24. Illumination device according to claim 1, in which the optical waveguide has a radiation exit area, through which part of the radiation coupled into the optical waveguide leaves the optical waveguide.

25. Illumination device according to claim 24, in which a large part of the radiation coupled into the optical waveguide leaves the optical waveguide through the radiation exit area.

26. Illumination device according to claim 24, in which the radiation exit area of the optical waveguide is formed in planar fashion.

27. Illumination device according to claim 24, in which the radiation exit area has one of the following curvatures at least in places: spherical, elliptic, aspherical.

28. Illumination device according to claim 24, in which the radiation exit area is formed such that it scatters light diffusely.

29. Illumination device according to claim 24, in which the radiation exit area is roughened.

30. Illumination device according to claim 1, in which the optical waveguide is formed as a solid body.

31. Illumination device according to claim 1, in which the optical waveguide is free of cavities.

32. Illumination device according to claim 1, in which the optical waveguide is formed from a transparent material.

33. Illumination device according to claim 1, in which the material from which the optical waveguide is formed has a refractive index of at least 1.3.

34. Illumination device according to claim 1, in which the optical waveguide contains one of the following materials: PMMA, polycarbonate, °PMMI, COC, glass.

35. Illumination device according to claim 1, in which the radiation entrance area has one of the following curvatures: spherical, elliptic, aspherical.

36. Illumination device according to claim 1, in which the light source comprises at least one light-emitting diode chip.

37. Use of the illumination device according to claim 1 for the backlighting of a display.

* * * * *

UNITED STATES PATENT AND TRADEMARK OFFICE
CERTIFICATE OF CORRECTION

| | | |
|---|---|---|
| PATENT NO. | : 7,942,565 B2 | Page 1 of 1 |
| APPLICATION NO. | : 11/915780 | |
| DATED | : May 17, 2011 | |
| INVENTOR(S) | : Gunnar Klick et al. | |

It is certified that error appears in the above-identified patent and that said Letters Patent is hereby corrected as shown below:

ON THE TITLE PAGE:

Item (56) References Cited, under Other Publications, column 2, line 2, delete "Phs." and insert -- Phys. --.

Item (57) Abstract, column 2, line 5, delete "reflection" and insert -- reflection, --.

Page 2, Other Publications, column 2, line 1, delete "Japan" and insert -- Taiwan --.

IN THE CLAIMS:

Column 18, line 20, Claim 34, delete "°PMMI," and insert -- PMMI, --.

Signed and Sealed this
Twenty-eighth Day of August, 2012

David J. Kappos
*Director of the United States Patent and Trademark Office*